H. L. FISHER.
COTTON PICKING MACHINE.
APPLICATION FILED AUG. 22, 1912.
1,229,599.
Patented June 12, 1917.
5 SHEETS—SHEET 2.
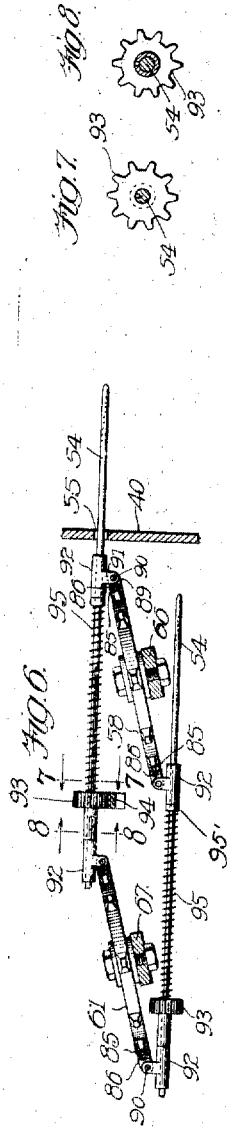
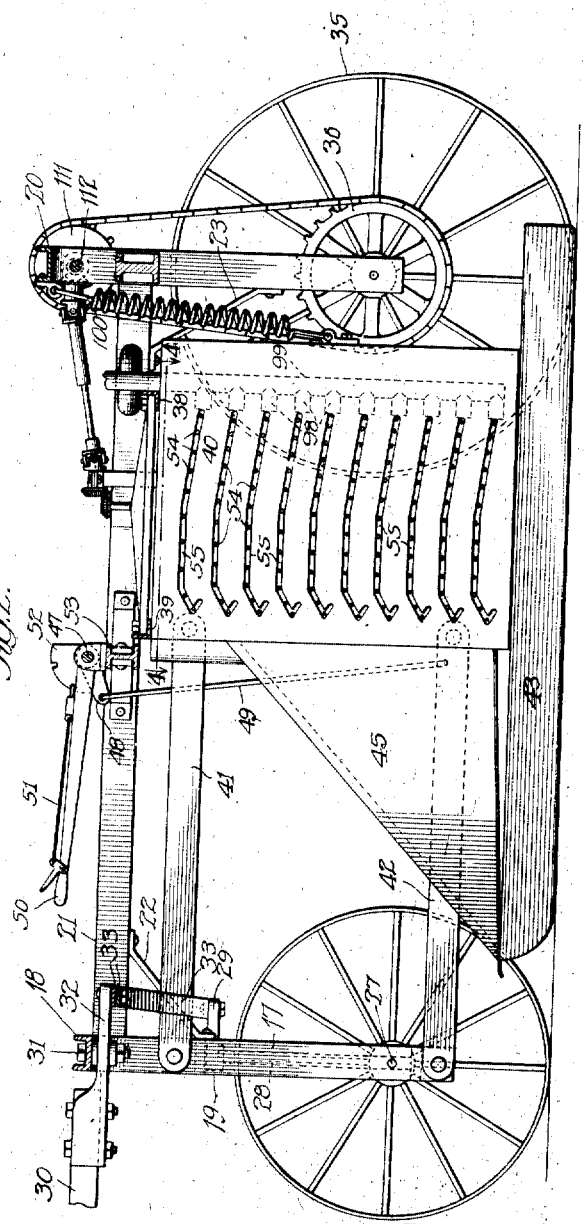

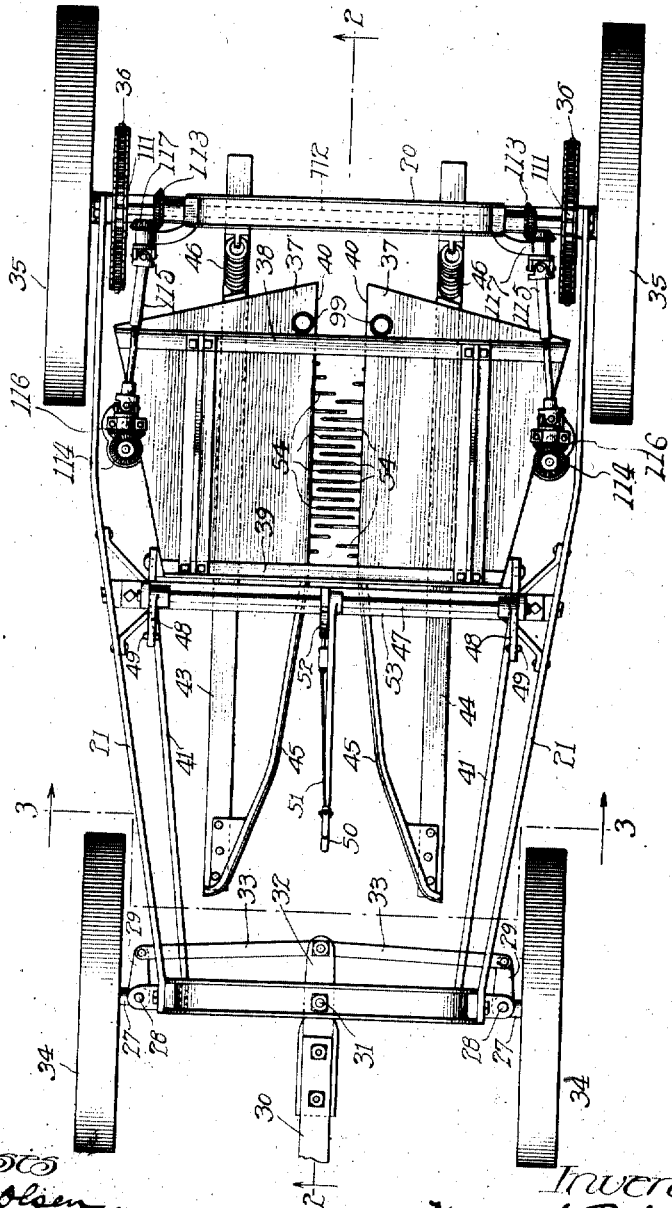

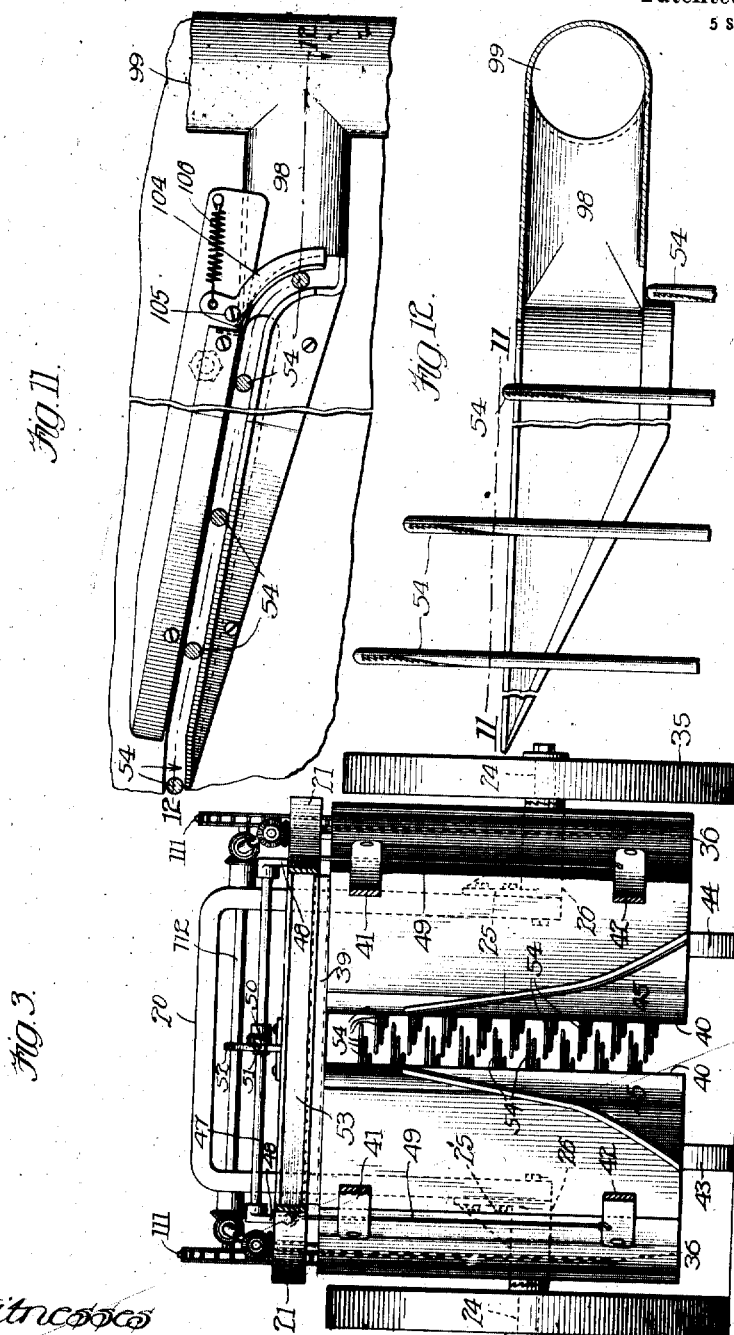

H. L. FISHER.
COTTON PICKING MACHINE.
APPLICATION FILED AUG. 22, 1912.
1,229,599.
Patented June 12, 1917.
5 SHEETS—SHEET 4.
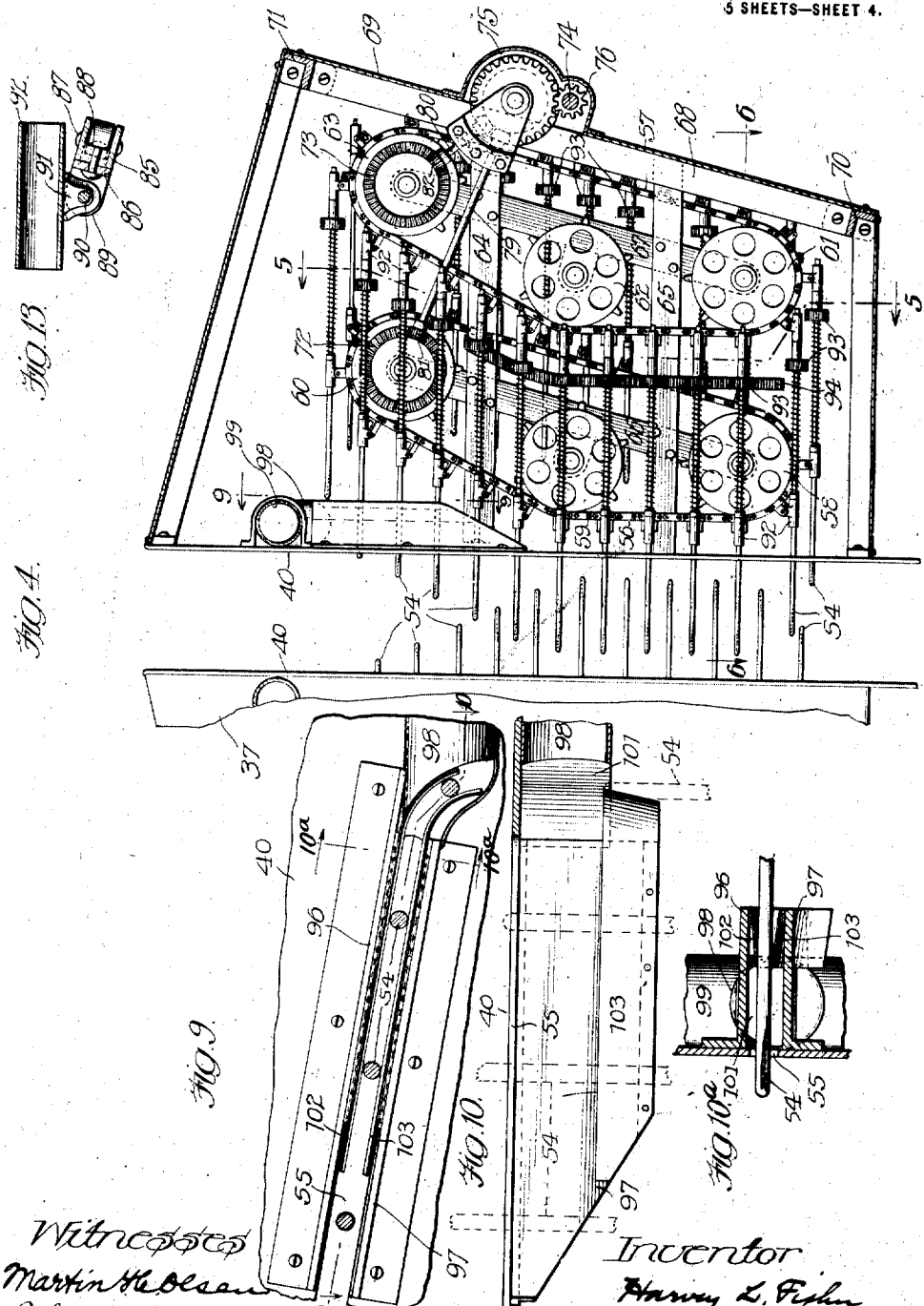

H. L. FISHER.
COTTON PICKING MACHINE.
APPLICATION FILED AUG. 22, 1912.
1,229,599.
Patented June 12, 1917.
5 SHEETS—SHEET 5.
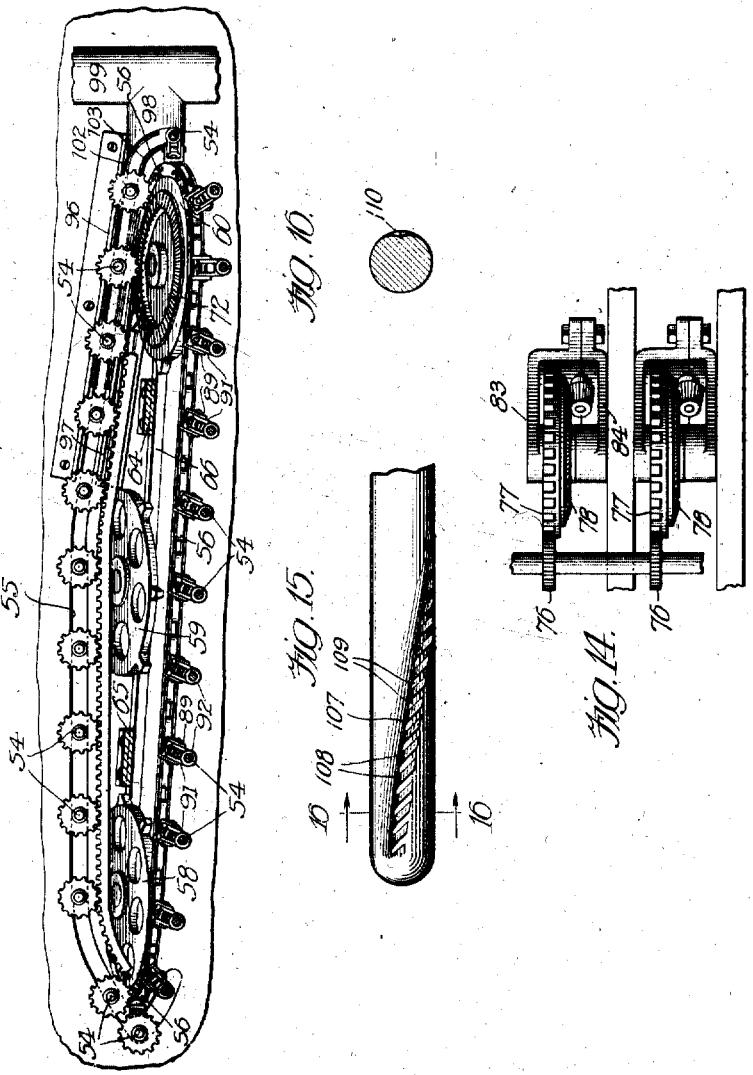
Witnesses
Martin H. Olsen
Robert Dobberman
Inventor
Harvey L. Fisher
By Ruston Fisher Davis Macauley
Attys

UNITED STATES PATENT OFFICE.

HARVEY L. FISHER, OF CHICAGO, ILLINOIS, ASSIGNOR TO DONALDSON & FISHER COMPANY, OF CHICAGO, ILLINOIS, A CORPORATION OF ARIZONA.

COTTON-PICKING MACHINE.

1,229,599.  Specification of Letters Patent.  Patented June 12, 1917.

Application filed August 22, 1912. Serial No. 716,385.

*To all whom it may concern:*

Be it known that I, HARVEY L. FISHER, a citizen of the United States, residing at Chicago, in the county of Cook and State of Illinois, have invented certain new and useful Improvements in Cotton-Picking Machines, of which the following is a specification.

The object of my invention is a cotton picking machine which will rapidly and thoroughly pick all the ripe cotton on the plants to which it is applied, without breaking or injuring them or the unopened bolls of immature cotton, which may be operated by those unskilled in mechanics and with a minimum of attention on the part of the operator, and which is sufficiently light, easy running and strong for the purpose, and may be built at a moderate cost. One of the main facts about the cotton plant which makes the problem a difficult one, is that the bolls do not all ripen together but mature at different periods, requiring a number of pickings of the same plant. It is therefore necessary that in the earlier pickings the plants and immature bolls be uninjured or the value of the crop is materially diminished. With this in view my machine consists in a truck or vehicle adapted to span a single row of plants without injuring the neighboring rows and to be drawn along over the row carrying a pair of picker mechanisms, arranged on opposite sides of the machine and between which is a passage or channel through which the plants pass as the machine is drawn forward. As the plants enter the passage they are penetrated and explored by a series or battery of toothed picker spindles or fingers, which travel backward with the plant as the machine is drawn forward, while they revolve to grip and wind up the cotton with which they come in contact. The spindles are so closely positioned with respect to each other throughout the height and thickness of the plant that it is impossible for an opened boll to escape contact with one of them, and yet they are sufficiently separated to permit an unopened boll to go through the passage without injury.

In the accompanying drawings and following specification, I have described in detail a preferred form of machine embodying my invention. It is to be understood, however, that the specific form of machine is illustrative only and disclosed for the purpose of exemplification, and that my invention is not limited to the details of construction disclosed, but is pointed out in the following claims.

Referring now to the drawings forming a part of this application, Figure 1 is a plan view of the picker machine of preferred construction; Fig. 2 is a central, longitudinal, vertical section upon the line 2—2 of Fig. 1; Fig. 3 is a vertical, transverse section upon the broken line 3—3 of Fig. 1, looking in the direction of the arrows; Fig. 4 is a horizontal section upon the line 4—4 of Fig. 2; Fig. 5 is a partial or fragmentary view in elevation, parts being shown in section upon the line 5—5 of Fig. 4; Fig. 6 is a detailed sectional view upon the line 6—6 of Fig. 4, looking in the direction of the arrows; Figs. 7 and 8 are sectional details upon the line 7—7 and 8—8 respectively of Fig. 6, looking in the direction of the arrows; Figs. 9 and 10 are details on an enlarged scale, the former on the line 9—9 of Fig. 4, looking in the direction of the arrows, and the latter in horizontal section upon the line 10—10 of Fig. 9; Fig. 10$^a$ is a section upon the line 10$^a$—10$^a$ of Fig. 9 looking in the direction of the arrows; Figs. 11 and 12 are similar views of a modification, Fig. 11 being taken on the line 11—11 of Fig. 12 and the latter on the line 12—12 of Fig. 11; Fig. 13 is a central sectional view on an enlarged scale of a detail; Fig. 14 is a side elevation of certain features of the machine partially in section, and Figs. 15 and 16 are a fragmentary elevation and a section upon the line 16—16 of Fig. 15 respectively of one of the spindles on an enlarged scale. The same symbol of reference has been applied to each part throughout the drawings and the following specification.

In the form of my invention shown in the drawings, the cotton-picking mechanism is mounted upon a truck or carriage adapted to be propelled by draft animals, but it will be evident that it is equally adapted for use in connection with a motor-driven vehicle, in which event the picker mechanisms may be driven either from the traction wheels as in the machine illustrated or more directly from the motor. The truck consists of a rigid frame mounted upon four wheels with a clear longitudinal passage therethrough, the frame with this end in view consisting of a pair of connected arches, the forward arch 17 being an I-beam bent to form a transverse member 18 and a pair of depending legs or members, one of which is shown in Fig. 2 at 19. The rear arch 20 is similar in construction but of greater height for a reason which will appear, and the two arches are connected by longitudinally extending side pieces 21, the angles between which and the legs of the arches to which they are attached being braced as at 22, 23 (see Fig. 2). The rear wheels of the vehicle are mounted upon spindles 24, 24 extending through and secured in the lower ends of the legs of the rear arch, and for greater strength brackets 25, 25 are secured to both of the outer faces of the arch ends and also receive the journals of the rear wheels in the hubs or bosses 26, 26 which are bored in register with the openings in the lower ends of the arch for this purpose. The front wheels, however, are not mounted directly upon the lower ends of the front arch, but in order to provide for steering the machine their journals 27, 27 project horizontally from a pair of vertically-pivoted rods 28, 28, which are mounted in suitable brackets projecting from the legs or upright members of the arch and provided at their upper ends with rearwardly extending crank arms 29, 29.

In Figs. 1 and 2, I have shown the machine provided with a tongue 30 to which the draft animals are to be secured and which is pivoted at 31, but a rearward extension 32 thereof provides a convenient attachment for links 33, 33 connecting it to the crank arms 29, 29 so that the front wheels 34, 34 of the vehicle turn with the tongue. The rear wheels 35, 35 as before stated are journaled upon stub shafts extending directly from the rear arch, and a sprocket wheel 36 is mounted upon the journal of and secured to each rear wheel as a means through which the mechanism of the picker may be driven from the wheels of the vehicle as hereinafter described.

The picker mechanism is in duplicate on opposite sides of the machine and is substantially inclosed in a pair of housings 37, 37 connected together by L-beams 38, 39 at the rear and front of the top respectively, but spaced to form a passage for the cotton plant between their smooth adjacent walls 40, 40. The picker mechanisms are movable as a unit vertically with respect to the trunk or carriage to which they are connected by longitudinally extending links 41, 42, pivoted near the top and bottom respectively of the outside walls of the picker chambers and to the inside of the vertical members of the legs of the front arch (see Figs. 1 and 2). A pair of parallel skids 43, 44 is interposed between the picker mechanism and the ground and extends considerably ahead of the former, to the inner walls of which the front ends of the skids are connected by a forwardly flaring pair of guides or wings 45, 45, which serve to draw together the laterally extending branches of the plants of the row being treated to cause them to enter the picking passage. The picker mechanism is partially supported from the truck or carriage, when in its lowered position, by a pair of heavy coiled springs 46, 46, which are attached at their upper ends to the crown of the rear arch and at their lower ends to the rear walls of the picker housings by suitable eye brackets. The strength of the springs is such that the skids or runners remain in contact with the ground and partially support the picker mechanism but the weight resting upon them is not such as to make the friction excessive or to prevent their rising slightly to pass obstructions.

It is desirable, however, when the machine is to be transported from place to place to raise the skids and picker mechanism until they are entirely supported by the truck and for this purpose, I have provided a transverse shaft 47, which is provided at its opposite ends with rigid arms 48, 48 connected by links 49, 49 with horizontal links 42, 42. An operating handle 50 is also rigidly mounted upon the transverse shaft for rocking the latter and raising and lowering the picker mechanism, and a suitable latch 51 on a handle coöperates with a notched sector 52 to lock the shaft with the picker mechanism in either position. As shown in Figs. 1 and 2, the lock shaft is mounted upon a cross-brace 53, though it may be mounted in any other manner or convenient location.

The picker mechanism, as stated above, is mounted in two similar housings upon opposite sides of the machine and as the mechanisms in the housings are identical in every respect, it will be sufficient for the present purpose to describe one of them, it being understood that the description applies equally to the mechanism upon the opposite side of the machine. As stated in the introductory part of the specification, the picker fingers are arranged to travel backward with a speed equal to the forward speed of the device as a whole, when in contact with the plants, and that they are so closely arranged with respect to each other that no ripe cotton boll can escape contact with one of them and pass through the machine without losing its content of cotton. The picker fingers are projected into contact with the plants in the direction of their axes and those contained in the housing on one side of the machine extend, when projected, substantially to the wall of the housing on the other side of the machine, thereby penetrating the plants between the branches thereof throughout their thickness, and they are arranged in a series of horizontal rows of equally spaced elements, the horizontal rows of pickers of one mechanism alternating with the rows of the other picker mechanism, the pickers of one mechanism being also offset or staggered horizontally with reference to those of the other set, thus producing a regular and close arrangement and even distribution of the pickers traveling through the picking passage. In Fig. 2, the inner wall of one picker chamber is shown at 40 and the arrangement of the pickers 54 projecting from that side of the machine is clearly shown, and in Fig. 1 the alternation of the pickers in the horizontal plane is illustrated.

The mechanism for projecting, retracting, advancing and rotating the picker fingers is mainly shown in Figs. 4, 5, 6, 7, 8 and 13. As shown in Fig. 2, the inner wall of each housing is provided with a series of generally horizontal slots 55, 55, through which the pickers are projected and along which they are fed and finally retracted, the slots at their forward ends being bent downward and then backward as shown in Fig. 2 and at their rear ends inclined slightly downward for a purpose which will appear. A distinct set of picker fingers is fed along each slot from the beginning to the end thereof in regular succession and withdrawn or retracted at the rear end of the slot and returned within the housing to the forward end of the slot to repeat the operation. For this purpose the picker fingers of each horizontal series are mounted upon a pair of endless sprocket chains 56, 57, (see particularly Fig. 4) each mounted upon and guided by a series of three sprocket wheels 58, 59, 60 and 61, 62, 63, respectively. The sprocket wheels are mounted upon a horizontal section or frame comprising the transversely-extending struts 64, 65 and the inclined struts 66, 67, which are formed of suitable structural steel and removably secured within the housing, the transverse struts preferably being bolted to the inner wall of the housing and to a horizontal structural member 68 within the outer wall of the casing, it being understood that there is one such member for each of the sections in the casing. The outer wall 69 of the housing is removable, being merely bolted or screwed to the corner irons 70, 71 and when removed permits access to the interior of the housing whereby it is possible to remove any one of the sections or frames and its attached mechanism as a unit upon unscrewing the necessary bolts. By this arrangement and construction of parts in the event that any element of the machine is broken the unit of which it forms a part may be readily removed and replaced by a perfect substitute without any considerable delay or inconvenience. And it has the further advantage that in case the cotton plants to be picked are shorter than the maximum capacity of the machine, that is to say do not rise to the level of the higher picking units, the latter may be removed, thereby lightening the machine, and the number of parts to be operated and consequently the power to be applied. A reference to Figs. 5 and 6, the latter of which, as before stated, is a vertical elevation, will show the relative position and arrangement of the sprocket wheels. From these figures, it will be seen that the sprocket wheels are arranged at an angle, preferably of 14 or 15 degrees to the horizontal, the purpose being that the spindles which are attached to the endless chains passing over these sprockets shall be returned to the forward end of the machine at a lower level than that at which they are fed backward when operating upon the plants. It will also be noted by reference to Figs. 4 and 5 that the rear sprockets are not only more remote from the inner wall of the housing than are the front and intermediate sprockets, but they are also at a slightly lower level corresponding to the direction of the slots shown in Fig. 2. The purpose of this arrangement will appear later. Each of the rear sprockets 60, 63 is formed upon its upper face with a beveled crown gear 72, 73 for driving and is driven from a shaft 74 extending vertically throughout the housing in a pocket 75 formed in the outer wall 69 of the casing and provided with a series of spur pinions 76, one for each of the sets of spindles. A fragmentary section of the shaft 74 is illustrated in elevation in Fig. 14 with two of its pinions 76, 76 meshing with gear wheels 77, 77 which are formed on their underside with beveled gears 78, 78 from which the above-mentioned crown gears 72, 73 are driven respectively through the intermediary of a long and a short shaft 79, 80, each having a pair of beveled pinions 81, 82 upon its opposite ends. The beveled gears 78 are mounted in brackets 83, 84 which are attached below and above to the member 64 of the frame of the section and these brackets also provide journal bearings for the shafts 79 and 80. It will be apparent that the only continuous vertical member of the mechanism thus described is the driving shaft 74, and this member is preferably journaled to or mounted on the rear wall 69 of the housing and is removable therewith so that when the wall is removed, the picker sections or units may be removed entire which construction facilitates cleaning and repair.

The manner of mounting the spindles upon the chains may be seen by reference to Figs. 4, 6 and 13. It is essential to the operation of the device that the spindles be universally pivoted to the chains in order to permit them to travel around the end sprockets and to be lowered and raised from one level to the other. Referring more particularly to Fig. 13, which shows the construction on an enlarged scale, one of the links of the chain is shown in section at 85 and on the outer face thereof is pivoted a yoke 86, the pivot 87 of which extends through a bridge 88 connecting the side members of the links for this purpose. The side members or ears 89 of the yoke are perforated to form bearings for a pivot pin 90, which extends through perforations in ears 91 extending from the sleeve 92 which receives the spindle or picker finger. This identical mounting is used to connect each of the picker fingers to each of the chains and it will be observed by a reference to Figs. 4 and 6 that it permits the spindles to shift from a position above the sprocket chains first to a position in the horizontal plane thereof, then to a position below the same and finally to resume their position above the chains as the spindles are progressively fed rearwardly of the machine, retracted, fed forward and projected. Each of the spindles carries a gear 93 by which it is given a rapid revolution when in the projected position, at which time the pinion travels horizontally along a stationary rack 94 arranged in the path of the pinion for this purpose (see Figs. 4 and 5). The rack extends parallel to the course of the spindles throughout that portion thereof in which the spindles are fully projected and through a portion of the distance or path during which they are being withdrawn. It is desirable, however, that the spindles be yieldingly supported so that they may give way in the direction of their axes when meeting an obstruction and this is particularly necessary to avoid injury to the cotton plant or the unripe bolls. With this end in view, the spindles are loosely mounted in the sleeves 92 and keyed to the pinions 93 as shown particularly in Figs. 6, 7 and 8, and in order to normally hold the spindles in their operative or projected position, springs 95 are provided between the pinions and collars 95' upon the spindles as shown in Fig. 6.

Provision is made for stripping the cotton from the spindles as they are withdrawn into the housing. For this purpose, I arrange a pneumatic chamber inside the housing and adjacent and on opposie sides of the rear portion of the slot through which the spindles travel and within such chamber I provide means for stripping the cotton from the spindles. As shown in Figs. 9 and 10, the chamber in each instance consists of an upper and a lower member 96, 97 arranged upon opposite sides of and close to the series of spindles, and the chamber is connected by a tubular passage 98 with a riser 99 common to all the series of pickers and leading to a fan 100, and a storage chamber 101 which, in the present instance, I have shown as located behind the picker mechanism. Within the pneumatic chamber and extending longitudinally of the slot therein, I arrange a pair of light, resilient plates 102, 103 which are in contact at their edges above and below with the series of picker fingers passing therebetween, and as these spring plates are inclined with reference to this portion of the path of the picker fingers, the latter are drawn through between the edges of the plates and the cotton stripped from them, whereupon it is immediately withdrawn by the pneumatic means and fed to the storage chamber. The stripper mechanism above described is preferred by me, but in Figs. 11 and 12, I have shown a different form thereof which is also very effective for the purpose. In this second form of stripping mechanism, the springs are dispensed with and the lower edge of the inside slot of the stripping chamber is acute, and so located with reference to the path of the picker fingers that the latter bear upon the same with some degree of pressure. The upper member of the stripping chamber, which is formed in two sections as in the previously-described modification, also approaches closely to the picker fingers and at its rear end, where the course of the picker fingers turns downwardly, is provided with a curved spring member 104 which is pivoted at 105 and held in gentle contact with the picker fingers by a spring 106. As these picker fingers wipe past the acute edge of the stripping chamber during the period when they are being retracted, the cotton is removed therefrom as previously described, drawn away by the suction mechanism and deposited in the storage chamber. The picker fingers may be provided with any of a variety of barbs or projections for entangling the cotton and starting it to wind upon the spindle. In Figs. 15 and 16, I have shown a form of finger which has proven satisfactory in which a single spiral series of barbs is formed upon the finger, which is preferably of metal, by cutting a spiral groove 107 conforming to the direction of the series of teeth to be formed and having an abrupt edge upon one side and then forming a series of cross grooves 108, the metal remaining between the grooves constituting teeth or barbs 109 having abrupt outer ends 110. This form of finger is that preferred by me and is superior to any similar devices of the prior art in that it is easy to manufacture, the spiral form of the groove and arrangement of teeth permits a larger number of teeth or barbs with a single groove than is possible with a series longitudinally of the finger and the direction of the teeth or barbs which as shown are sharply inclined with their points toward the outer end of the finger facilitates stripping. Thus as soon as the fingers cease to rotate and the tension on the cotton wound upon the finger is somewhat relieved its elasticity causes it to relax and it is readily stripped from the fingers.

As heretofore observed, sprockets 36 are fixed to the rear vehicle wheels upon the inner sides of their hubs and sprocket chains extend therefrom to sprocket wheels 111, 111 upon a transverse shaft 112 journaled in the arch near its crown. The shaft 112 is also provided near its opposite ends with bevel gears 113 for driving the picker mechanisms. The shafts 74 of the latter carry at their upper ends beveled gears 114—114 and between said gears and the beveled gears upon the transverse shaft 112 extend telescopic radius shafts 115—115 which are universally jointed at their opposite ends to shafts bearing beveled gears 116—117 meshing with the gears upon the vertical shafts and those upon the horizontal shaft respectively.

The operation of the machine has been fully described in connection with the construction but may be summarized as follows: The machine is drawn along astraddle a row or number of cotton plants to be picked which are guided by the wings or guides 45 into the plant passage between the picker chambers. Before reaching the plants the picker mechanism is lowered so that the skids are in contact with the ground. As the plants enter the passage between the picker housings, the spindles are fed inward successively from each side and penetrate between the branches from one side of the plant to the other and as before remarked are so thickly distributed that they necessarily come in contact with any opened cotton boll. Each picker remains in contact with any boll which it may have touched a sufficient time for the teeth in their rotation to become entangled with the loose cotton and wind it up, since the spindles remain for a substantial period substantially stationary relative to the plant by reason of the fact that they are fed rearwardly at the same speed that the machine progresses along the row of plants. After the required period each spindle is retracted gradually and wiping across or between the inner edges of the vacuum chamber slot is stripped of its cotton which is carried by the draft created by the fan to the storage receptacle. The spindles are then carried around the rear sprockets and turned under the chains, carried forward and again projected and brought to the upper side of the pair of chains ready for a repetition of the operation. If, however, as before explained, a spindle comes in contact with a resisting material it is forced backward against the pressure of its spring until it is in some way relieved and permitted to resume its projected position, or is withdrawn by the travel of the chains which carry it.

It will now be seen that the machine described and shown above is comparatively simple in operation and construction and capable of completely removing all the cotton from the plants treated without injury either to the plants themselves or to the unripe bolls. While the above is the best form of my invention at present known to me, it is obvious that many changes may be made therein without departing from the gist of my invention as set forth in the following claims.

I claim:

1. In a machine for picking cotton, a truck, cotton-picking mechanism mounted thereon comprising, a plurality of superposed sets of picking fingers, means for successively projecting the fingers of each set into contact with the cotton plants to be picked and moving them rearwardly of the machine without changing the axial direction of the fingers.

2. In a cotton picking machine, a truck or carriage, cotton picking mechanism mounted thereon comprising a plurality of superposed independently mounted sets of fingers, means for successively projecting the fingers of each set into contact with the cotton plants to be picked, and moving them rearwardly of the machine at a speed substantially equal to the speed of the forward movement of the machine.

3. In a cotton-picking machine, a truck or carriage, a cotton-picking mechanism mounted thereon comprising a plurality of superposed sets of fingers, means for successively projecting the fingers of each set into contact with the cotton plants and moving them along with the same without changing the axial direction of the fingers, the speed of rearward movement of the fingers being equal to the speed of forward movement of the device as a whole.

4. In a cotton-picking machine, a truck or carriage, cotton-picking mechanism mounted thereon comprising a plurality of superposed sets of picker fingers, means for maintaining the picker fingers substantially parallel to each other and projecting them successively into and withdrawing them from contact with the plant and for carrying them laterally with respect to their axial direction and rearwardly of the machine.

5. In a cotton-picking machine, a carriage or truck, cotton-picking mechanism mounted thereon comprising a plurality of superposed pairs of carrying devices movable in parallel paths, picker fingers each mounted upon both carrier devices of each pair and movable laterally thereby rearwardly of the machine.

6. In a cotton picking machine, a vertical series of parallel endless chains, each having a portion of its path extending substantially horizontal and longitudinally of the machine, a separate series of picker fingers connected to each said chain and movable therewith longitudinally of the machine, and means for keeping said fingers respectively transverse to the machine.

7. In a cotton picker of the class described, a carriage, a series of endless chains mounted thereon, each having a portion of its course substantially horizontal and parallel to the line of movement of the machine, and another portion of its course displaced laterally from the first said portion, a series of picker fingers mounted upon each said chain, means for maintaining the picker fingers at all times in substantially parallel relation to each other, and means for reciprocating the picker fingers axially.

8. In a cotton picking machine, a vertical series of pairs of superposed endless chains substantially parallel throughout their courses, a set of picker fingers mounted across each pair of endless chains and carried laterally thereby, and means for driving the endless chains.

9. In a cotton picking machine, a vertical series of superposed pairs of endless chains substantially parallel throughout their courses, a set of picker fingers mounted across each pair of chains and carried laterally thereby, said picker fingers axially reciprocable with respect to said chains, means for reciprocating the picker fingers, and means for driving the endless chains.

10. In a cotton-picking machine, a carriage or truck, a plurality of superposed sets of pickers mounted thereon and adapted to be projected into contact with the cotton to be picked, means for carrying the pickers rearwardly of the machine on one level and feeding them forwardly of the machine on a different level while maintaining all the fingers substantially parallel.

11. In a cotton-picking machine, a truck, a cotton-picking mechanism thereon comprising a wall having a series of longitudinal slots therein, an endless series of picker fingers for each slot, means for projecting, progressing and retracting the fingers through the slots while maintaining them substantially perpendicular to the wall.

12. In a cotton picking machine a truck, a cotton picking mechanism thereon comprising a wall having a series of longitudinal slots therein, an endless series of picker fingers for each slot, means for projecting the fingers of each series successively and in order at the forward end of its slot and for progressing and retracting the fingers in order through the slots while maintaining them substantially perpendicular to the wall.

13. In a cotton-picking machine, a truck, a cotton-picking mechanism thereon comprising a wall having a series of longitudinal slots therein, an endless series of picker fingers for each slot, means for successively projecting, progressing and retracting said fingers through the slots while maintaining them substantially perpendicular to said wall, and means for rotating the picker fingers.

14. In a cotton-picking machine, a truck, a cotton-picking mechanism thereon comprising a wall having a series of longitudinal slots therein, an endless series of picker fingers for each slot, means for successively projecting, progressing and retracting fingers through the slots while maintaining them substantially perpendicular to said wall, and means for rotating the picker fingers during a portion of the movement thereof.

15. In a cotton picking machine, a carriage, a pair of endless chains arranged in parallel course thereon, the loop of each chain being inclined transversely of the machine, picker spindles each mounted on both said chains and means for driving the chains.

16. In a cotton picking machine, a truck or carriage, picker mechanism thereon comprising an endless chain, spindles mounted thereon and arranged to travel rearwardly for a portion of their path in a substantially horizontal plane and in the reverse direction on a different level and laterally removed from their rearward path, and means to maintain the spindles substantially parallel throughout their courses.

17. In a cotton-picking mechanism, a truck or carriage, picker mechanism mounted thereon comprising an endless chain, means for guiding and actuating said chain comprising sprockets at either end of the loop thereof, inclined transversely of the truck, picker fingers carried by the endless chain and adapted to be fed rearward of the machine in one level and forwardly with respect thereto in another level.

18. In a cotton picker, a truck or carrier, and a cotton picking mechanism mounted thereon comprising a pair of endless chains arranged in parallel courses substantially longitudinal of the machine, the backward run of each chain being substantially horizontal, the forward run of the chains being on a lower level and more remote from the center of the truck than the backward runs of the chain, and a series of spindles each mounted upon both chains.

19. In a cotton picker, a truck or carriage and a cotton picker mechanism mounted thereon, comprising a pair of endless chains arranged in parallel courses substantially longitudinally of the machine, the forward run of the chains being on a lower level than the rearward run of the chains and more remote from the longitudinal center of the machine, and a series of spindles each pivotally mounted upon both chains.

20. In a cotton picker, a truck or carriage, and a cotton-picker mechanism mounted thereon comprising a pair of endless chains arranged in parallel courses substantially horizontally and longitudinally of the machine, the run of the chains in one direction being on a lower level than the run of the chains in the other direction, and a series of spindles each universally pivoted upon both chains.

21. In a cotton-picking machine, a carriage or truck, and a cotton-picking mechanism mounted thereon comprising a series of fingers, endless chains carrying the fingers and means supporting and actuating the endless chains and arranged to move them in paths first substantially horizontal and parallel to the axis of the carriage then at an acute angle thereto, then in a direction to further retract the spindles, then in a forward direction and then in a direction to project the spindles.

22. In a cotton picking machine, a carriage and a picker mechanism thereon, comprising a plurality of superposed series of picker fingers, means for carrying the fingers rearward of the carriage during the forward motion of the latter, gears on the fingers, a stationary rack with which said gears directly engage when the fingers are moved rearwardly and means for maintaining said fingers at all times crosswise of the machine.

23. In a cotton-picking machine, a carriage, a picker mechanism thereon comprising a support, a series of independent substantially horizontal superposed frames mounted on the support but detachable therefrom, a carrier mounted on each frame and a series of spindles mounted on each carrier and adapted to be carried thereby rearwardly of the machine.

24. In a cotton-picking machine, the combination of a carriage and a cotton-picking mechanism mounted thereupon comprising a vertical series of independent superposed carriers, means for moving the carriers longitudinally of the machine, and a series of picker spindles on each carrier.

25. In a cotton-picking machine, the combination of a carriage and a cotton-picking mechanism comprising a plurality of superposed substantially horizontal series of spindles, means for carrying the spindles successively rearwardly of the machine and separate means for rotating the spindles of each horizontal series.

26. In a cotton-picking machine, the combination of a carriage and a cotton-picking mechanism mounted thereon comprising a plurality of superposed substantially horizontal series of spindles, means for carrying the spindles rearwardly of the machine, and separate means for rotating the spindles of each horizontal series comprising a pinion upon each of the spindles and a stationary rack with which the pinions engage.

27. In a cotton-picking machine, the combination with a carriage, of a picker mechanism mounted thereon and comprising a vertical series of superposed endless chains, the loop of each extending longitudinally of the carriage, spindles mounted on the chains and means to actuate the latter to carry the spindles longitudinally of the machine.

28. In a cotton-picking machine, the combination with a carriage, of a picker mechanism mounted thereon and comprising a vertical series of superposed endless chains, the loop of each extending longitudinally of the carriage, spindles mounted on the chains and means to actuate the latter to carry the spindles longitudinally of the machine, and means for rotating the spindles during a portion of their movement of translation.

29. In a cotton-picking machine, the combination with a carriage, of a picker mechanism mounted thereon and comprising a vertical series of superposed endless chains, the loop of each extending longitudinally of the carriage, spindles mounted on the chains and means to actuate the latter to carry the spindles longitudinally of the machine, and means for rotating the spindles during a portion of their movement of translation comprising a stationary rack and a pinion upon each of the spindles.

30. In a cotton-picking machine, the combination of a carriage and a cotton-picking mechanism mounted thereon, comprising a vertical series of superposed substantially independent cotton-picking units, each comprising the following elements; an endless chain, a front and a rear sprocket for guiding, supporting and driving the chain and a series of picker spindles mounted on the chains.

31. In a cotton-picking machine, the combination of a carriage and a cotton-picking mechanism, comprising a series of independent superposed cotton-picking units, each comprising the following elements; a pair of endless chains, front and rear sprockets for guiding, supporting and driving the chains and a series of picker spindles mounted across the chains.

32. In a cotton-picking machine, the combination of a carriage and a picking mechanism comprising a vertical series of independent horizontal cotton-picking units, each comprising the following elements; an endless chain, a front and a rear sprocket for guiding, supporting and driving the chain, and picker spindles mounted on the chain; a vertical shaft and means for driving each of the endless chains from said shaft.

33. In a cotton-picking machine, the combination of a carriage and a picking mechanism comprising a vertical series of independent horizontal cotton-picking units, each comprising the following elements; an endless chain, a front and a rear sprocket for guiding, supporting and driving the chains, and picker spindles mounted on the chain; a vertical shaft and means for driving each of the endless chains from said shaft comprising a gear 77 driven from said shaft and connections from said gear to one of the sprockets.

34. In a machine for picking cotton, a vertical series of sets of picking fingers, means for successively projecting the fingers horizontally into contact with the plants from which cotton is to be picked, moving them rearwardly, withdrawing them, changing their elevation, returning them forwardly and again projecting them.

35. In a cotton-picking machine, a series of cotton picking fingers, means for successively projecting them, moving them first in a horizontal plane, then down an incline, then retracting them, returning them forwardly of the machine and again projecting them.

36. In a cotton-picking machine, a truck, a pair of sprocket wheels arranged substantially in the same horizontal plane and canted substantially equally with respect thereto and transversely of the truck, a chain carried by said sprockets, a series of picker fingers pivoted to the chain, means for maintaining the fingers in an approximately horizontal direction at all points in their path and means for operating the chain whereby said fingers will be projected and elevated, fed rearwardly of the machine, retracted and lowered and fed forwardly of the machine.

37. In a cotton picking machine, a pair of endless sprocket chains extending longitudinally of the machine but arranged side by side, sprockets carrying the chains and canted transversely of the machine, a series of picker fingers connected to the chain and arranged to be carried thereby in one direction above the sprockets and in the other direction below the sprockets, and means for driving the chains.

38. In a cotton-picking machine, a pair of sprocket wheels canted laterally of the machine, an endless chain carried by the sprocket wheels, a series of sleeves universally pivoted to the sprocket chain, picker fingers mounted in the sleeves, means for maintaining the picker fingers in a substantially horizontal position and means for driving the chain.

39. In a cotton-picking machine, a pair of parallel endless chains arranged side by side and extending longitudinally of the machine, means for supporting the chains on an incline so that the forward run of each chain is at a different height from the rearward run, sleeves universally pivoted to said chains and a series of picker fingers carried by said sleeves and arranged to be fed rearwardly above the chains and forwardly below the same.

40. In a cotton-picking machine, an endless chain extending longitudinally thereof, means for supporting the chain with its forward run below its rearward run, a series of lugs 86 pivoted to the chain, a series of sleeves pivoted in the lugs, a series of fingers carried by the sleeves and means for driving the chain.

41. In a cotton-picking machine, a series of cotton-picking fingers, means for rotating the same, feeding them rearwardly of the machine and retracting them, a pair of resilient plates 102—102, curved at one end and arranged to contact with opposite sides of the fingers as they are retracted.

HARVEY L. FISHER.

Witnesses:
JOHN B. MACAULEY,
ROBERT DOBBERMAN.